(12) United States Patent
Yan et al.

(10) Patent No.: US 7,813,509 B2
(45) Date of Patent: Oct. 12, 2010

(54) KEY DISTRIBUTION METHOD

(75) Inventors: Jun Yan, Shenzhen (CN); Dongjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 782 days.

(21) Appl. No.: 10/589,177

(22) PCT Filed: Jan. 31, 2005

(86) PCT No.: PCT/CN2005/000133

§ 371 (c)(1),
(2), (4) Date: Jun. 21, 2007

(87) PCT Pub. No.: WO2005/112338

PCT Pub. Date: Nov. 24, 2005

(65) Prior Publication Data
US 2007/0280482 A1    Dec. 6, 2007

(30) Foreign Application Priority Data
Feb. 16, 2004    (CN) .................. 2004 1 0005740

(51) Int. Cl.
*H04L 9/00* (2006.01)
*H04L 9/08* (2006.01)
(52) U.S. Cl. ................. 380/278; 380/277; 380/279; 380/282; 713/171; 713/155
(58) Field of Classification Search .............. None
See application file for complete search history.

(56) References Cited

U.S. PATENT DOCUMENTS 6,490,358 B1    12/2002    Geer et al.
6,614,781 B1 *  9/2003     Elliott et al. ............ 370/352
6,981,263 B1 * 12/2005     Zhang et al. ............. 719/310

(Continued)

FOREIGN PATENT DOCUMENTS

EP    0 912 026 A2    4/1999

(Continued)

OTHER PUBLICATIONS

Menezes et al., "Handbook of Applied Cryptography, Simple Key Establishment Models." *Handbook of Applied Cryptography, CRC Press Series on Discrete Mathematices and ITS Applications* (1997): 546-550.

(Continued)

*Primary Examiner*—Syed A. Zia
(74) *Attorney, Agent, or Firm*—Conley Rose, P.C.; Grant Rodolph

(57) ABSTRACT

A key distribution method for the next generation network (NGN), includes steps of: (a) a terminal sending a registration request message to a soft switch; (b) the soft switch sending an authentication request message to an authentication center; (c) the authentication center authenticating the terminal, then the soft switch distributing the session key to the terminal after the registration authentication being passed. The invention implements the key distribution during the registration authentication, thus the traffic is smaller, and it could be associated with the specialties of the NGN, and improve the efficiency of solving the security problem, the registration authentication of the terminal and the distribution of the key are more suitable specifically for the NGN.

10 Claims, 7 Drawing Sheets

U.S. PATENT DOCUMENTS

| | | | |
|---|---|---|---|
| 7,349,412 B1 * | 3/2008 | Jones et al. | 370/401 |
| 7,466,710 B1 * | 12/2008 | Clemm et al. | 370/401 |
| 7,506,370 B2 * | 3/2009 | Aggarwal | 726/14 |
| 7,590,843 B1 * | 9/2009 | Khalil et al. | 713/171 |
| 7,599,352 B2 * | 10/2009 | Ruckstuhl | 370/352 |
| 2002/0120760 A1 * | 8/2002 | Kimchi et al. | 709/230 |
| 2002/0147820 A1 | 10/2002 | Yokote | |
| 2003/0005280 A1 | 1/2003 | Bobde et al. | |
| 2003/0033521 A1 | 2/2003 | Sahlbach | |
| 2003/0088769 A1 | 5/2003 | Quick et al. | |
| 2003/0147519 A1 * | 8/2003 | Jain et al. | 379/211.02 |
| 2003/0147537 A1 | 8/2003 | Jing et al. | |
| 2004/0105542 A1 * | 6/2004 | Takase et al. | 380/44 |
| 2005/0036482 A1 * | 2/2005 | Goroshevsky et al. | 370/352 |
| 2008/0167034 A1 * | 7/2008 | Li et al. | 455/433 |

FOREIGN PATENT DOCUMENTS

| | | |
|---|---|---|
| WO | WO 01/26322 A3 | 4/2001 |
| WO | 03/053074 A1 | 6/2003 |
| WO | WO 03/053074 A1 | 6/2003 |

OTHER PUBLICATIONS

Frankel et al., "Security Issues in a CDPD Wireless Network." *IEEE Personal Communications* (1995): 16-27.

Jacobs et al., "Security of Current Mobile IP Solutions." *Milcom 97 Proceedings* 3(1997): 1122-1128.

Jordan et al., "Secure Multicast Communications using a Key Distribution Center." *Proceedings of the IFIP TC6 International Conference on Information Networks and Data Communication* (1994): 367-380.

Smith, Richard E.. *Internet Cryptography*. 4. Reading, MA: Addison-Wesley, 1997.

Harkins et al., "The Internet Key Exchange (IKE)." *Network Working Group RFC 2409, Internet Engineering Task Force (IETF) Standards Track* (1998): 1-19.

Maughan et al., "Internet Security Association and Key Management Protocol (ISAKMP)." *Network Working Group RFC 2408, Standards Track* (1998): 1-31.

* cited by examiner

KEY DISTRIBUTION METHOD

FIELD OF THE INVENTION

The invention relates to the security management technique in communication, particularly to a key distribution method for the Next Generation Network (NGN).

BACKGROUND OF THE INVENTION

The NGN is an integrated open network architecture that incorporates various services such as voice, data, multimedia and the like and provides real-time session services to users. Network equipments thereof include a small number of core devices and a large number of user terminals. In the network, interactions with the Public Switched Telephone Network (PSTN)/Public Land Mobile Network (PLMN) are circuit-based and hence relatively secure, but interactions between other network devices are transported over a packet-based core network and various packet access networks. Over the open IP network, the NGN is liable to illegal attacks, and particularly, there are a large number of packet terminals in the NGN that can be initiators of illegal attacks.

There has been no any satisfactory solution for the NGN security, and it is still a blank regarding how to incorporate a key distribution process that is the basis for the network security together with characteristics of the NGN. In the prior art, the key negotiation approach as defined in the network layer security standard IPSec (Network Layer Security) is the Internet Key Exchange (IKE) protocol, and the key negotiation approach of the transport layer security standard TLS (Transport Layer Security) is achieved through the Handshake protocol as defined in the TLS specifications. Here, the key encryption and exchange of the IKE protocol adopts the Diffie-Hellman algorithm that defines a group of 5 D-H parameters (i.e., a prime number p and a base number g). This encryption algorithm features a strong robustness and a long length of key. As seen from the above, the IKE is both a strict and a rather complex key exchange protocol, and the Handshake protocol enables a one-side (mainly for a server) or two-side authentication between a client and the server. Moreover, the encryption algorithm and key and the verification algorithm and key used in the negotiation protocol as well as the session parameters obtained through a negotiation can be reused by the recording protocol for a plurality of connections, thus avoiding the overhead resulted from negotiating new session parameters for each connection. Also, the protocol can ensure that the negotiation process will be reliable and the resultant shared key will be secure.

Although all the above key distribution protocols are standard and strict, they have the same drawback of failing to be incorporated with the concrete characteristics of the NGN. The NGN is a relatively close network and includes a series of network-side servers (e.g., a soft switch, an application server, and various gateways) and a large number of access terminals, the terminals and the network devices are under the management and control of one operator, and there exists an administrative domain which manages the devices therein and assists in achieving the feature of intercommunication between cross-domain users. Also, all the terminals have to be registered in the administrative domain. These characteristics of the NGN determine that a centralized key distribution approach is suitable for the NGN. However, all the above key distribution protocols involve a direct negotiation of keys between terminals or two mainframes, which eventually results in that the traffic in the system grows in geometric progression and the key distribution efficiency is degraded, and brings a lot of inconvenience to the whole network system and the key management, thus being not accommodated to the concrete characteristics of the NGN.

SUMMARY OF THE INVENTION

The present invention is to provide a secure and efficient key distribution method that can enable a centralized key distribution, can be accommodated to characteristics of the NGN, and can be used flexibly.

In view of the above, an embodiment of the present invention provides a key distribution method applied in the Next Generation Network including a terminal, a soft switch and an authentication center, wherein the method may include steps of:

a) the terminal sending a registration request message to the soft switch for a registration;

b) the soft switch sending the authentication request message to the authentication center for the authentication for the terminal; and c) the authentication center authenticating the terminal, generating a session key for the terminal and the soft switch, and upon a successful registration authentication, sending the session key to the soft switch to be distributed to the terminal.

Optionally, in step c), the authentication center may authenticate the terminal through steps of:

c1) the authentication center generating a first verification word for the terminal according to a key Kc shared with the terminal, encrypting the session key with the shared key Kc, and returning the encrypted session key and the first verification word to the soft switch;

c2) the soft switch returning a registration failure response message to the terminal to notify the terminal of a registration failure;

c3) the terminal generating a second verification word according to the key Kc shared with the authentication center, and sending a registration message containing the second verification word to the soft switch for a registration again; and c4) the soft switch authenticating the terminal according to the first verification word and the second verification word.

Optionally, in step c), the soft switch may distribute the session key to the terminal through steps of:

c5) the soft switch returning to the terminal a registration success response message containing the session key encrypted with the shared key Kc, and sending a terminal authentication success message to the authentication center; and c6) the terminal decrypting the session key encrypted by the authentication center according to the shared key Kc.

Optionally, the method may further include steps of: the terminal sending to the soft switch a list of security mechanisms supported by the terminal and priority information of each security mechanism;

the soft switch choosing an appropriate security mechanism for communication according to the list of security mechanisms and the priority information of each security mechanism of the terminal.

Optionally, the registration request message and the registration message may be SIP protocol registration messages, the registration failure response message may be a SIP protocol response message, and the registration success response message may be a SIP protocol registration request success message.

Optionally, the registration request message may be a system restart message and a corresponding response message in the MGCP protocol, the registration failure response message and the registration success response message may be a notification request message and a corresponding response message in the MGCP protocol, and the registration message may be a notification message and a corresponding response message in the MGCP protocol.

Optionally, the registration request message may be a system service status change message and a corresponding response message in the H.248 protocol, the registration failure response message and the registration success response message may be an attribute modification message and a corresponding response message in the H.248 protocol, and the registration message may be a notification message and a corresponding response message in the H.248 protocol.

Optionally, the registration request message may be a gatekeeper request message in the H.323 protocol, the registration failure response message may be a gatekeeper rejection message in the H.323 protocol, the registration message may be a registration request message in the H.323 protocol, and the registration success response message may be a registration success message in the H.323 protocol.

An embodiment of the present invention provides another key distribution method applied in the Next Generation Network including a terminal, a signaling proxy, a soft switch and an authentication center, wherein the method may include steps of:

a) the terminal sending a registration request message through the signaling proxy to the soft switch for registration;

b) the soft switch sending the authentication request message to the authentication center for the authentication for the terminal; and c) the authentication center authenticating the terminal, generating a session key for the terminal and the signaling proxy, and upon a successful registration authentication, sending the session key to the soft switch to be distributed to the terminal through the signaling proxy.

Optionally, in step c), the authentication center may authenticate the terminal through steps of:

c1) the authentication center generating a first verification word for the terminal according to a key Kc shared with the terminal and a key Ksp shared with the signaling proxy, encrypting the session key respectively with the shared key Kc and the shared key Ksp, and returning the encrypted session key and the first verification word to the soft switch;

c2) the soft switch returning a registration failure response message through the signaling proxy to the terminal to notify the terminal of a registration failure;

c3) the terminal generating a second verification word according to the key Kc shared with the authentication center, and sending a registration message containing the second verification word to the signaling proxy to be forwarded to the soft switch for registration again; and c4) the soft switch authenticating the terminal according to the first verification word and the second verification word.

Optionally, in step c), the soft switch may distribute the session key to the terminal through steps of:

c5) the soft switch forwarding to the signaling proxy a terminal registration success response message containing the session keys after being encrypted by the authentication center respectively with the shared keys Kc and Ksp, and the signaling proxy decrypting with the shared key Ksp the session key encrypted by the authentication with the shared key Ksp, calculating a message verification word for the registration success response message with the decrypted session key, and forwarding to the terminal the registration success response message containing the message verification word and the session key encrypted with the shared key Kc; and C6) the terminal decrypting the session key encrypted by the authentication center according to the shared key Kc, and authenticating with the decrypted session key the message authentication word of the message returned from the signaling proxy so as to authenticate the signaling proxy, integrity of the message and whether security mechanism parameters of the terminal returned from the signaling proxy are correct.

Optionally, the terminal may send to the signaling proxy a list of security mechanisms supported by the terminal and priority information of each security mechanism and the signaling proxy may choose an appropriate security mechanism for communication according to the security mechanisms supported by the terminal and the priority information of each security mechanism.

Optionally, the registration request message and the registration message may be SIP protocol registration messages, the registration failure response message may be a SIP protocol response message, and the registration success response message may be a SIP protocol registration request success message.

Optionally, the registration request message may be a system restart message and a corresponding response message in the MGCP protocol, the registration failure response message and the registration success response message may be a notification request message and a corresponding response message in the MGCP protocol, and the registration message may be a notification message and a corresponding response message in the MGCP protocol.

Optionally, the registration request message may be a system service status change message and a corresponding response message in the H.248 protocol, the registration failure response message and the registration success response message may be an attribute modification message and a corresponding response message in the H.248 protocol, and the registration message may be a notification message and a corresponding response message in the H.248 protocol.

Optionally, the registration request message may be a gatekeeper request message in the H.323 protocol, the registration failure response message may be a gatekeeper rejection message in the H.323 protocol, the registration message may be a registration request message in the H.323 protocol, and the registration success response message may be a registration success message in the H.323 protocol.

An embodiment of the present invention provides a key distribution system applied in the Next Generation Network comprising:

a terminal adapted to send a registration request message for a registration;

a soft switch adapted to receive and forward the authentication request message sent from the terminal for the authentication for the terminal; and an authentication center adapted to receive the authentication request message forwarded from the soft switch, to authenticate the terminal, to generate a session key for the terminal and the soft switch, and to send, upon a successful registration authentication, the session key to the soft switch so as to be distributed to the terminal.

An embodiment of the present invention provides another key distribution system applied in the Next Generation Network comprising:

a terminal adapted to send a registration request message for a registration;

a signaling proxy adapted to enable the terminal to send the registration request message therethough;

a soft switch adapted to receive and forward the authentication request message sent from the terminal through the signaling proxy for the authentication for the terminal; and an authentication center adapted to receive the authentication request message forwarded from the soft switch, to authenticate the terminal, to generate a session key for the terminal and the signaling proxy, and to send, upon a successful registration authentication, the session key to the soft switch so as to be distributed through the signaling proxy to the terminal.

Compared to the prior art, the invention has the following advantages:

1. According to the embodiment of the present invention, the soft switch communicates with the terminal and accomplishes the key distribution during the registration authentication, so that the traffic can be low, there can be a tight association with characteristics of the NGN and the efficiency in resolving the security issue throughout the entire system can be improved significantly. Therefore, the terminal registration authentication and the centralized key distribution can be more suitable for concrete conditions of the NGN.

2. According to the embodiment of the present invention, the registration process and the session key distribution process can be combined for the protocols of SIP, MGCP, H.248, H.323 and the like, and the session key can be distributed during the terminal authentication. Thus, there may be no need for a further key negotiation in subsequent communication, and the key distribution efficiency can be improved.

3. According to the embodiment of the present invention, the registration process and the security mechanism negotiation process can be combined for the protocols of SIP, MGCP, H.248, H.323 and the like, and the security mechanism negotiation can be accomplished during the key distribution. Thus, there may be no need for a further security mechanism negotiation in subsequent communication, and the security mechanism can be negotiated dynamically instead of statically and can be extended flexibly, which can lead to a flexible use thereof.

BRIEF DESCRIPTIONS OF THE DRAWINGS

Figure 7:
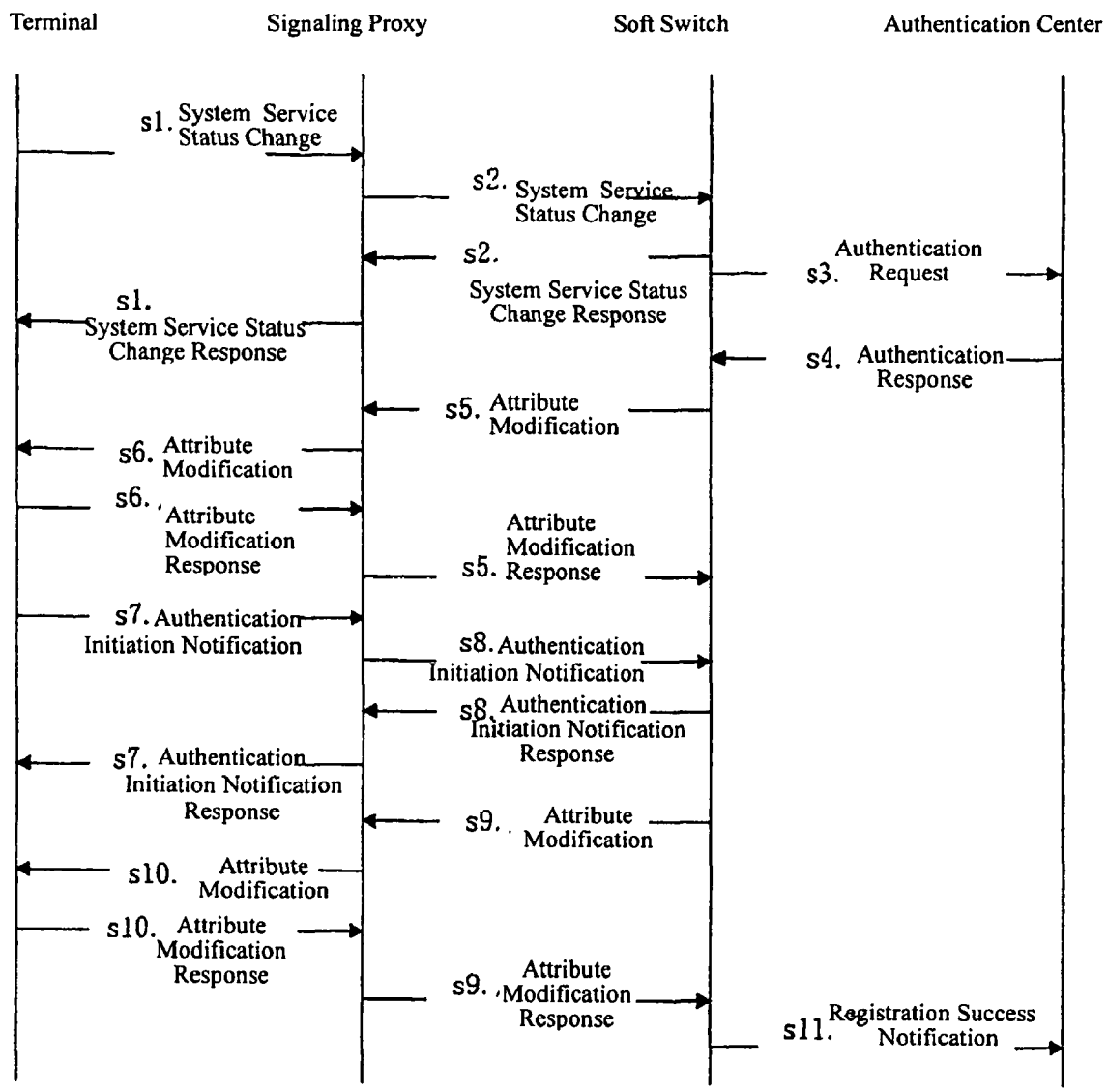
Figure 8:
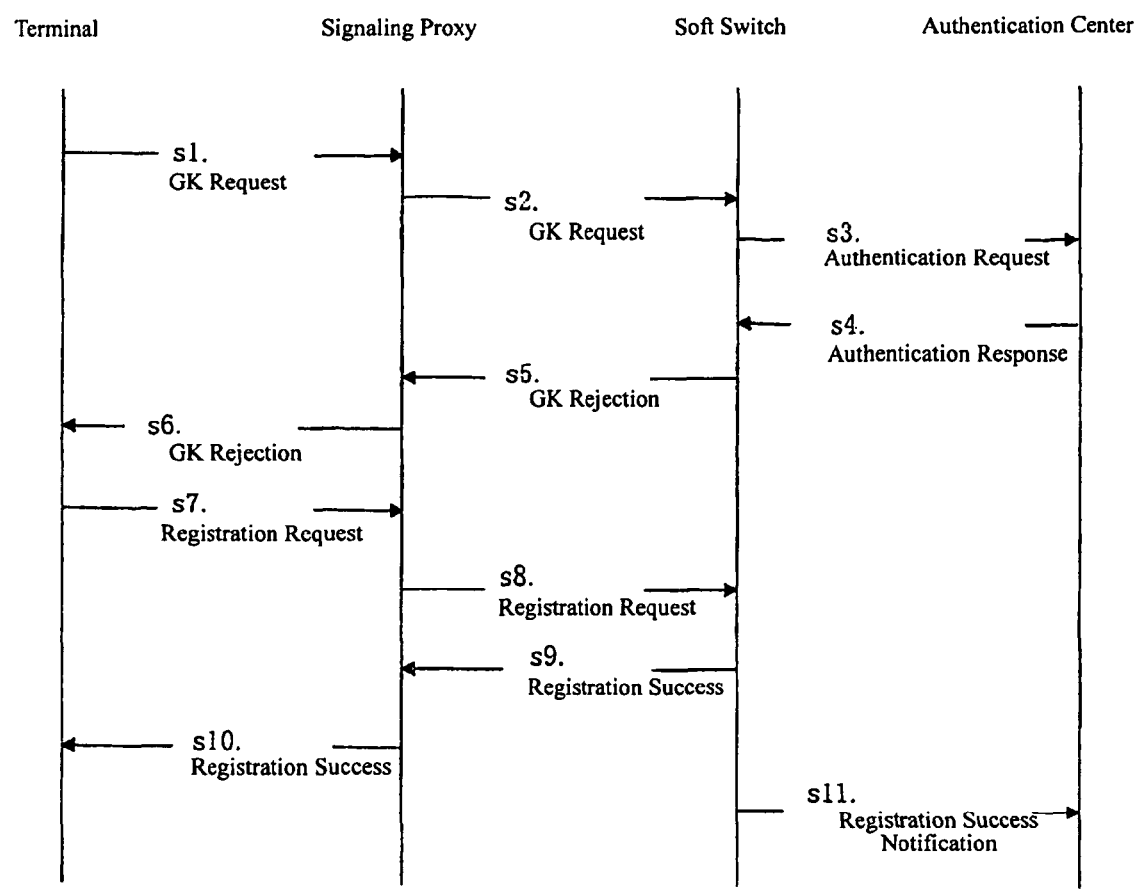

FIG. 7 is a schematic diagram of a communication process of a key distribution according to an embodiment of the present invention implemented in an H.248 protocol registration authentication process; and FIG. 8 is a schematic diagram of a communication process of a key distribution according to an embodiment of the present invention implemented in an H.323 protocol registration authentication process.

DETAILED DESCRIPTIONS OF THE EMBODIMENTS

In the NGN, the network security is a significant issue encountered in the actual network operations. The NGN would fail to be applied in large scale if the security issue cannot be dealt with.

Figure 1:
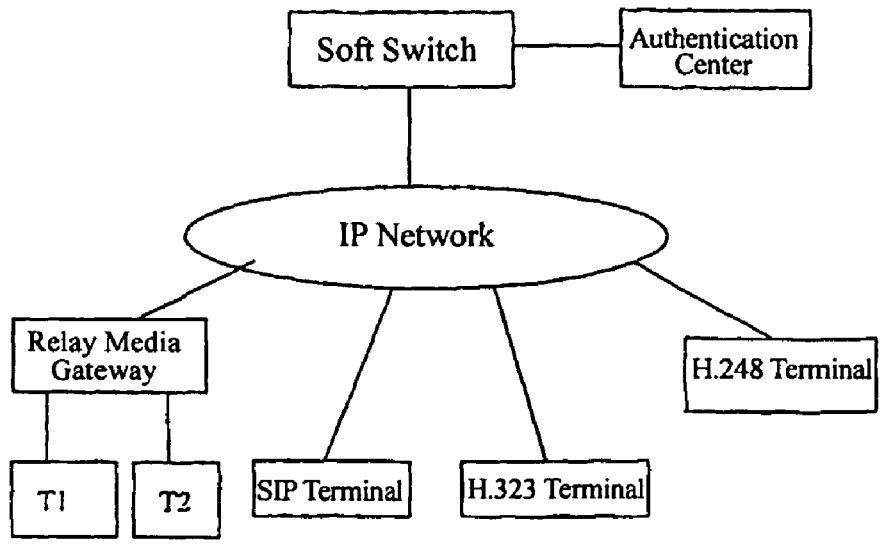
FIG. 1 is a schematic diagram of an NGN environment where a key distribution method according to an embodiment of the present invention is applied.

In the NGN, network devices mainly include terminals, a gateway, a soft switch and the like. FIG. 1 is a diagram of a simple uni-domain networking of the NGN, that is, there is only one soft switch (also referred to as a Media Gateway Controller (MGC)) device, although there may be a plurality of soft switches in an actual networking. In the NGN environment as shown in FIG. 1, the soft switch is connected to a relay Media Gateway, a Session Initiation Protocol (SIP) terminal, an H.323 terminal and an H.248 terminal through an IP network. Here, the relay Media Gateway is connected to analog telephones T1 and T2, and the soft switch is also connected to an Authentication Center AuC.

According to the embodiment of the present invention, there is a shared key between all of the network devices and the terminals and the authentication center AuC respectively. A shared key can be configured manually or issued by a network administrator for a network device, and can be assigned by the system or inputted by a user upon registration of a terminal device.

All the keys shared with the authentication center AuC are essential keys in the whole system and shall be safe-kept properly, and it is thus required that the network devices and the terminals have the abilities of never revealing the shared keys to a third party and of being against an embezzlement of the shared keys.

Furthermore, a session key between a terminal and a soft switch may be generated by the authentication center AuC.

According to the embodiment of the present invention, a registration authentication process is combined with a session key distribution process in connection with the characteristics of the NGN: a terminal initiates a registration with a soft switch; the soft switch requests for an authentication to an authentication center; the authentication center generates a session key for the terminal and the soft switch; and the soft switch distributes the session key to the terminal after a successful registration authentication. Since the session key is distributed during the registration authentication, and no further key negotiation is necessary in subsequent communication, therefore the processes of the registration authentication and the key distribution for the terminal can be simplified. Thus, the system efficiency and performance can be improved with a low requirement for the terminal, that is, the terminal does not have to support any complex key distribution protocol, and instead, only extensions on the existing call protocols are required.

Figure 2:
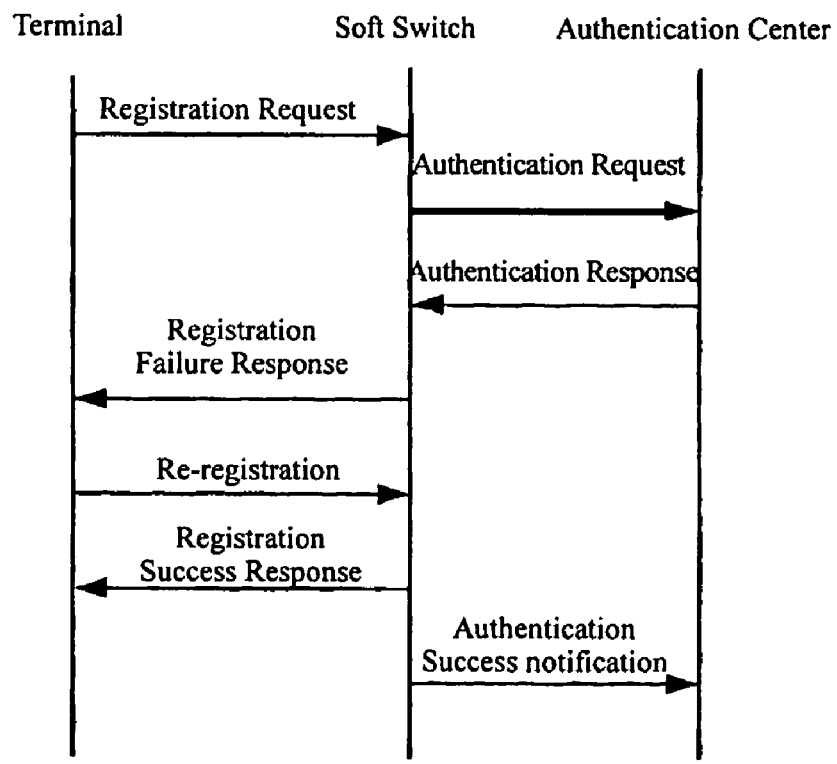
FIG. 2 is a schematic diagram of a communication process of the key distribution method according to an embodiment of the present invention in the network environment shown in FIG. 1.

FIG. 2 is a schematic diagram of a simple key distribution communication process described as following:

First, the terminal initiates a registration request to the soft switch, wherein a specific message is dependent upon the protocol supported by the terminal. Upon receipt of the registration request message, the soft switch requests the authentication center to authenticate the terminal. The authentication center generates a corresponding verification word (referred to as a first verification word hereinafter, for the convenience of distinguishing) and a session key according to information of the terminal, and then returns to the soft switch an authentication response message containing the first verification word and the session key. Upon receipt of the authentication response message, the soft switch sends a registration failure response message to the terminal, requesting the terminal to register again. The terminal generates a verification word (referred to as a second verification word hereinafter, for the convenience of distinguishing), and then reinitiates a registration request to the soft switch. The soft switch compares the first verification word with the second verification word submitted from the authentication center and the terminal. If the verification words are different, then the soft switch returns a registration failure response message to the terminal, requesting the terminal to register again; and if verification words are identical, then the authentication succeeds and the soft switch sends a registration success response message to the terminal containing the session key. Upon receipt of the message, the terminal can obtain the session key therefrom.

For a further improvement of the network security, the soft switch further requests the terminal to feed back a list of supported security mechanisms when returning the registration failure response message to the terminal. In this way, when the terminal reinitiates a registration to the soft switch, the registration message further includes the information on the list of security mechanisms supported by the terminal, the priority of each security mechanism and the like, and thus the soft switch can hereby choose an appropriate security mechanism for communication.

In fact, for the sake of the communication security, the network environment where the embodiment of the present invention is applied may further include a signaling proxy (SP). In the entire network environment, the communication between network devices over the signaling proxy is trustable, that is, it is required that in the networking those network devices be located in a trustable domain. In the case that the terminals are not trustable, the communication between the terminal and the signaling proxy may be not secure, that is, the terminals and the signaling proxy are located in a non-trustable domain, wherein the signaling proxy is a boundary between a trustable domain and a non-trustable domain.

According to the embodiment of the present invention, the signaling proxy can be a network device, such as a broadband access gateway or a Session Border Controller (SBC). In an actual implementation, it can be integrated as a function module, together with a module for the processing of media forwarding, into an IP gateway, and can also be a separate signaling proxy entity using such an architecture wherein the signaling is separated from the media, as described hereinafter.

Figure 3:
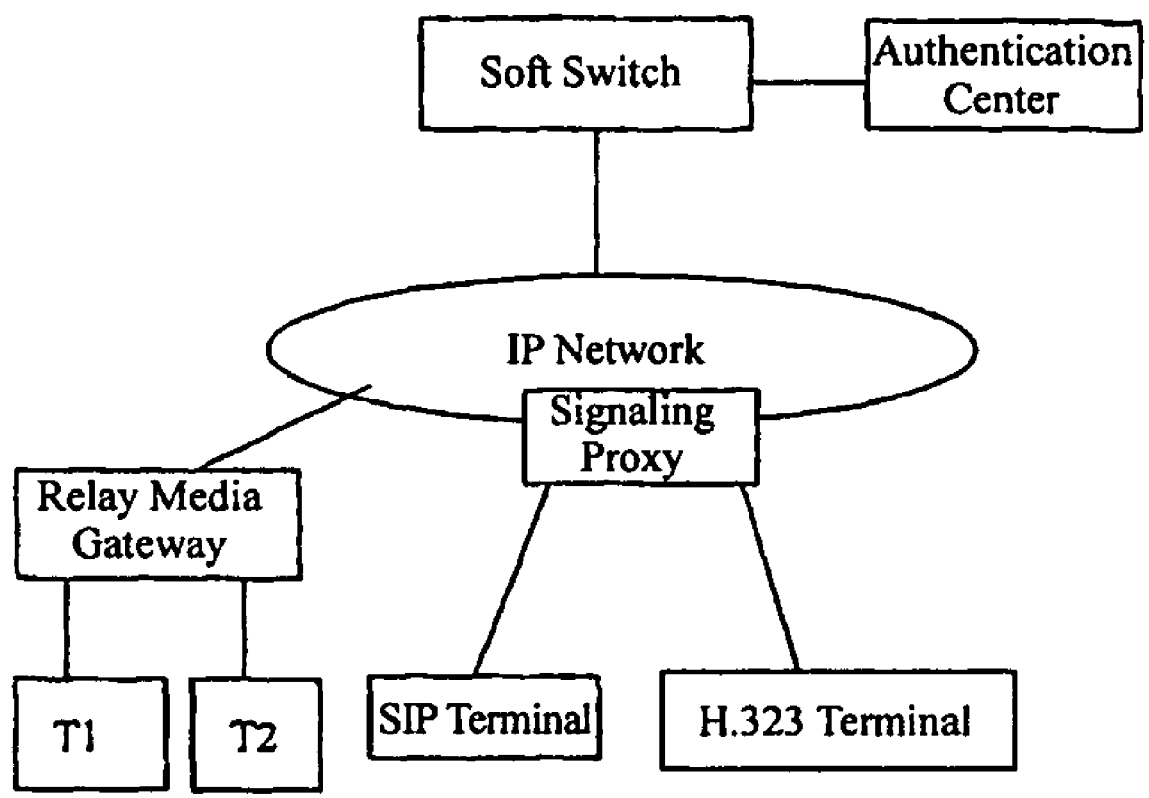
FIG. 3 is a schematic diagram of a network environment with a signaling proxy where the key distribution method according to an embodiment of the present invention is applied.

FIG. 3 is a network environment in which the signaling proxy is integrated into the IP gateway. In the network environment, the terminal communicates with the soft switch via the signaling proxy, and the session key between the above terminal and soft switch in the network environment is the session key between the terminal and the signaling proxy.

Figure 4:
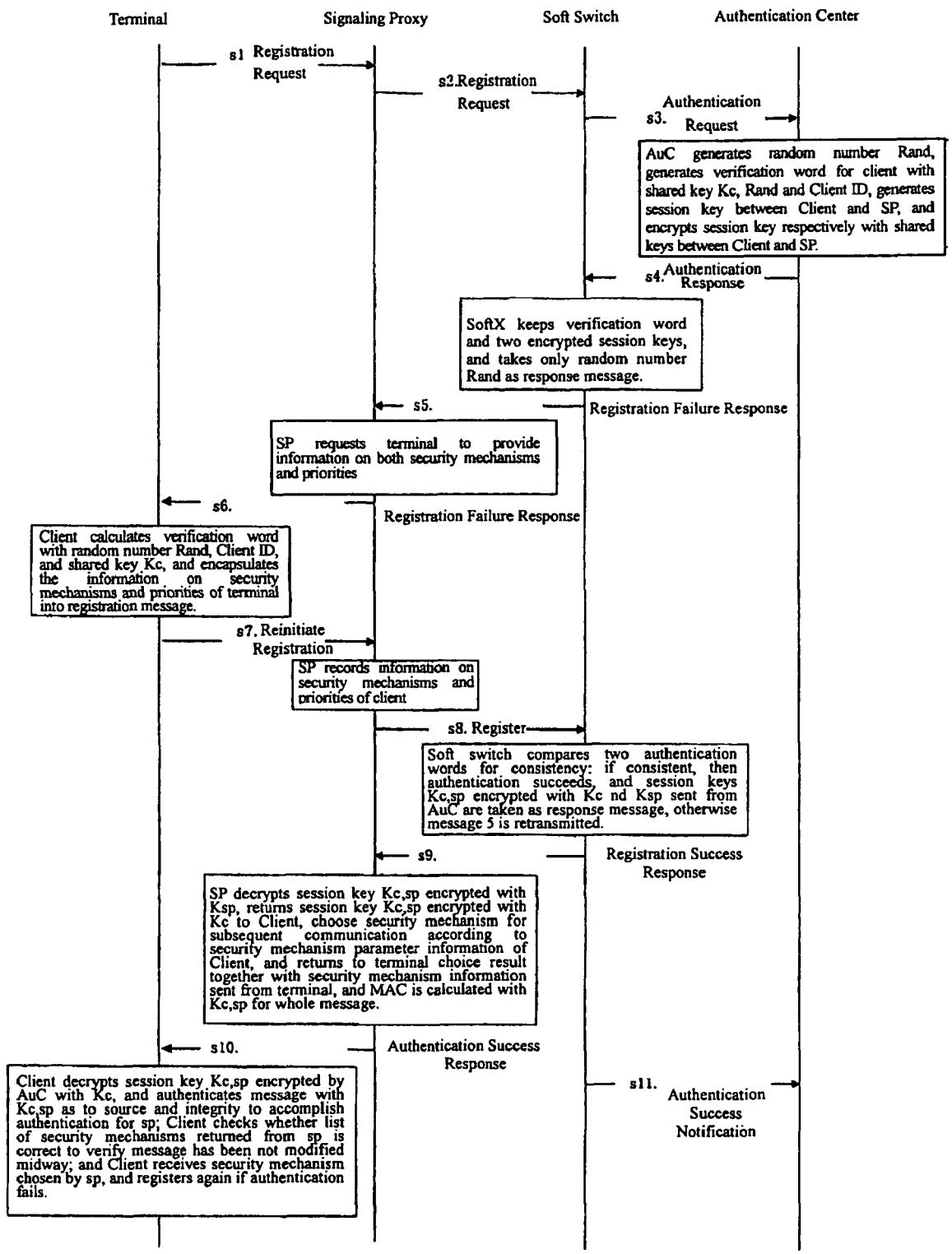
FIG. 4 is a schematic diagram of a communication process of the key distribution method according to an embodiment of the present invention in the network environment shown in FIG. 3.

FIG. 4 shows a communication process of a key distribution in the network environment with the signaling proxy shown in FIG. 3, as described hereinafter.

In step s1, the terminal sends a registration request message to the signaling proxy according to the protocol flow. Here, a common protocol registration message, of which a specific message is dependent upon the protocol supported by the terminal, is a plain protocol registration message without being encrypted or authenticated. The registration request message contains the following information:

IDc∥IDsp∥N1∥TS1
IDc: Client ID;
IDsp: Signaling Proxy ID;
N1: a random number or a serial number which is designed to identify a present message and shall be included in a returned response message for preventing a retransmission of the message (this number in a subsequent message means the same);
TS1: this is used for a signaling proxy to verify whether a terminal packet sequence number is synchronized with a signaling proxy packet sequence number;

In step s2, the signaling proxy forwards to the soft switch the registration request message of the terminal containing the following information:

IDc∥Dsp
IDc: Client ID;
IDsp: Signaling Proxy ID;

In step s3, the soft switch has no authentication information of the terminal, and hence sends an authentication request message with respect to the terminal to the authentication center (AuC) with the client ID and the signaling proxy ID provided. This message contains the following information:

IDc∥Dsp
IDc: Client ID;
IDsp: Signaling Proxy ID;

In step s4, the authentication center obtains a key Kc shared with the terminal, a key Ksp shared with the signaling proxy and other authentication information according to the client ID and the signaling proxy ID. It generates a challenge word random number Rand, generates a first verification word Authenticatorc for the terminal with the Rand, the IDc, the shared key Kc and the like, and also generates a session key Kc,sp between the terminal and the signaling proxy. It encrypts the session key Kc,sp respectively with the shared keys Kc and Ksp, and returns to the soft switch the Rand, the verification word and the encrypted session keys Kc,sp as such a response to the authentication request of the soft switch that contains the following information:

IDc∥IDsp∥Rand∥Authenticatorc∥EKc[Kc,sp]∥EKsp[Kc, sp]
Here, Authenticatorc=fm(Kc, Rand, IDc)
IDc: Client ID;
IDsp: Signaling Proxy ID;
Rand: a random number used for an authentication center to calculate a verification word, wherein the authentication center sends the Rand to a soft switch which in turn sends the Rand to a signaling proxy, and the signaling proxy sends the Rand to a terminal;
Authenticatorc: a verification word used for a soft switch to authenticate a terminal, and generated by an authentication center to be sent to a soft switch;
EKc[Kc,sp]: a session key Kc,sp encrypted by an authentication center with a shared key Kc.
EKsp[Kc,sp]: a session key Kc,sp encrypted by an authentication center with a shared key Ksp.

In step 5, the soft switch returns a registration failure response message to the signaling proxy, which is indicative of a registration failure and a re-authentication for the terminal being required and contains the challenge word Rand and the following information:

IDc∥IDsp∥Rand
IDc: Client ID
IDsp: Signaling Proxy ID;
Rand: a random number sent from an authentication center to a signaling proxy.

In step 6, the signaling proxy returns the registration failure response message to the terminal, which is indicative of a registration failure and a re-authentication for the terminal being required and similarly contains the challenge word Rand, and requests the terminal to feed back the information on the list of supported security mechanisms and the priority of each security mechanism. This message contains the following information:

IDc∥IDsp∥N1∥N2∥TS2∥Rand

IDc: Client ID;

IDsp: Signaling Proxy ID;

N1: identical to N1 in a registration message sent from a terminal to a signaling proxy and used to respond to a registration message;

N2: used to identify a present message;

TS2: used for a terminal to authenticate a time stamp;

Rand: a random number generated by an authentication center.

In step 7, the terminal recalculates a verification word with the shared key Kc, the client ID IDc and the returned random number Rand from the signaling proxy, and reinitiates a registration to the signaling proxy with a registration request message which contains a recalculated second verification word Authenticatorc and also contains the information on the list of security mechanisms supported by the terminal (such as the network layer security IPSec, the transport layer security TLS, the application layer security or the like) and the priority of each security mechanism. The signaling proxy chooses an appropriate security mechanism for the communication according to the information on respective security mechanisms of the terminal and priorities thereof. This registration message contains the following information:

IDc∥N1∥N2∥TS3∥Authenticatorc∥Security mechanism list

Here, Autllenticatorc=f(Kc, Rand, IDc)

IDc: Client ID;

N1: a new random number or serial number used to identify a present message;

N2: used to identify a response to a previous message from a signaling proxy;

TS3: used for a signaling proxy to authenticate a time stamp;

Authenticatorc: a verification word generated by a terminal;

Security mechanism list: a list of security mechanisms of a terminal and priorities thereof;

In step 8, the signaling proxy forwards to the soft switch the registration request message of the terminal, with or without information parameters of the terminal security mechanisms and the priorities thereof forwarded, since the soft switch doesn't require such information. This registration request message contains the following information:

IDc∥IDsp∥Authenticatorc

IDc: Client ID;

IDso: Signaling Proxy ID;

Authenticatorc: a verification word generated by a terminal.

In step 9, the soft switch compares the second verification word in the registration request message sent from the signaling proxy with the first verification word sent from the authentication center so as to authenticate the terminal. If the verification words are different, then the authentication fails and a registration failure response message can be retransmitted; and if the verification words are identical, then the authentication for the terminal succeeds and the soft switch may return to the signaling proxy a registration success response message containing both of the session keys Kc,sp between the terminal and the signaling proxy which are generated and encrypted respectively with the Kc and the Ksp by the authentication center. This message contains the following information:

IDc∥IDsp∥EKc[Kc,sp]∥∥EKsp[Kc,sp]

IDc: Client ID;

IDsp: Signaling Proxy ID;

EKc[Kc,sp]: a session key Kc,sp between a terminal and a signaling proxy which is encrypted by the authentication center with a shared key Kc;

EKsp[Kc,sp]: a session key Kc,sp between a terminal and a signaling proxy which is encrypted by the authentication center with shared key Ksp;

In step 10, upon receipt of the registration success response message from the soft switch, the signaling proxy forwards to the terminal the registration success response message, which contains the session key Kc,sp generated and encrypted with the shared key Kc of the terminal by the authentication center, and also contains both a security mechanism item chosen for the subsequent communication by the signaling proxy according to the security mechanism parameters of the terminal and contains the parameter list of security mechanisms of the terminal and the priority information (used for the terminal to determine whether these parameters have been modified while being transmitted over the network). In the end, the session key Kc,sp generated and encrypted with the Ksp by the authentication center are decrypted with the shared key Ksp to obtain the Kc,sp, and a message verification word (MAC) is calculated with the Kc,sp for the entire response message in order to ensure an integrity of the message and the authentication as to the signaling proxy by the terminal. This message contains the following information:

IDc∥IDsp∥N1∥N2∥TS4∥EKc[Kc,sp]∥∥Security mechanism∥Security mechanism list(c)∥fin (Kc,sp, message)

IDc: Client ID;

IDsp: Signaling Proxy ID;

N1: used to identify a response to the registration message of a terminal;

N2: used to identify a present message;

TS4: used for a terminal to verify a time stamp;

EKc[Kc,sp]: a session key Kc,sp between a terminal and the signaling proxy which is encrypted by the authentication center with the shared key Kc;

Security mechanism: a security mechanism chosen by the signaling proxy according to a list of security mechanisms of a terminal and priorities thereof;

Security mechanism list: a list of security mechanisms and priorities of the terminal, which is used for a terminal to determine that the list of security mechanisms received by the signaling proxy has not been modified illegally;

fm (Kc,sp, message): a whole message is authenticated with a session key Kc,sp with respect to its source and integrity; and a terminal authenticates an identity of a signaling proxy through abstracting the session key and identifying the message successfully, otherwise the signaling proxy fails to obtain the session key Kc,sp issued by an authentication center;

In step 11, the soft switch sends an authentication success message to the authentication center to update the terminal-related information. Meanwhile, the terminal decrypts the session key generated and encrypted with the Ksp by the authentication center to obtain the Kc,sp, and uses the Kc,sp to authenticate the MAC of the message returned from the signaling proxy. Thus, it is possible to authenticate the identity of the signaling proxy, the integrity of the message and whether the security mechanism parameters of the terminal itself returned from the signaling proxy are correct. If the parameters are correct, then it shows that the chosen security mechanism returned from the signaling proxy is correct, and messages may be processed through that security mechanism during a subsequent communication; and if the authentication as to the signaling proxy by the terminal fails or the security mechanism parameters are incorrect, then a registration may be reinitiated. This terminal authentication success message contains the following information:

IDc||IDsp||IPc|| . . .

IDc: Client ID;

IDsp: Signaling Proxy ID;

IPc: a registered IP address of a terminal, which may be an IP address translated by a signaling proxy.

A key distribution method according to an embodiment of the present invention will be described for a specific application protocol environment.

Figure 5:
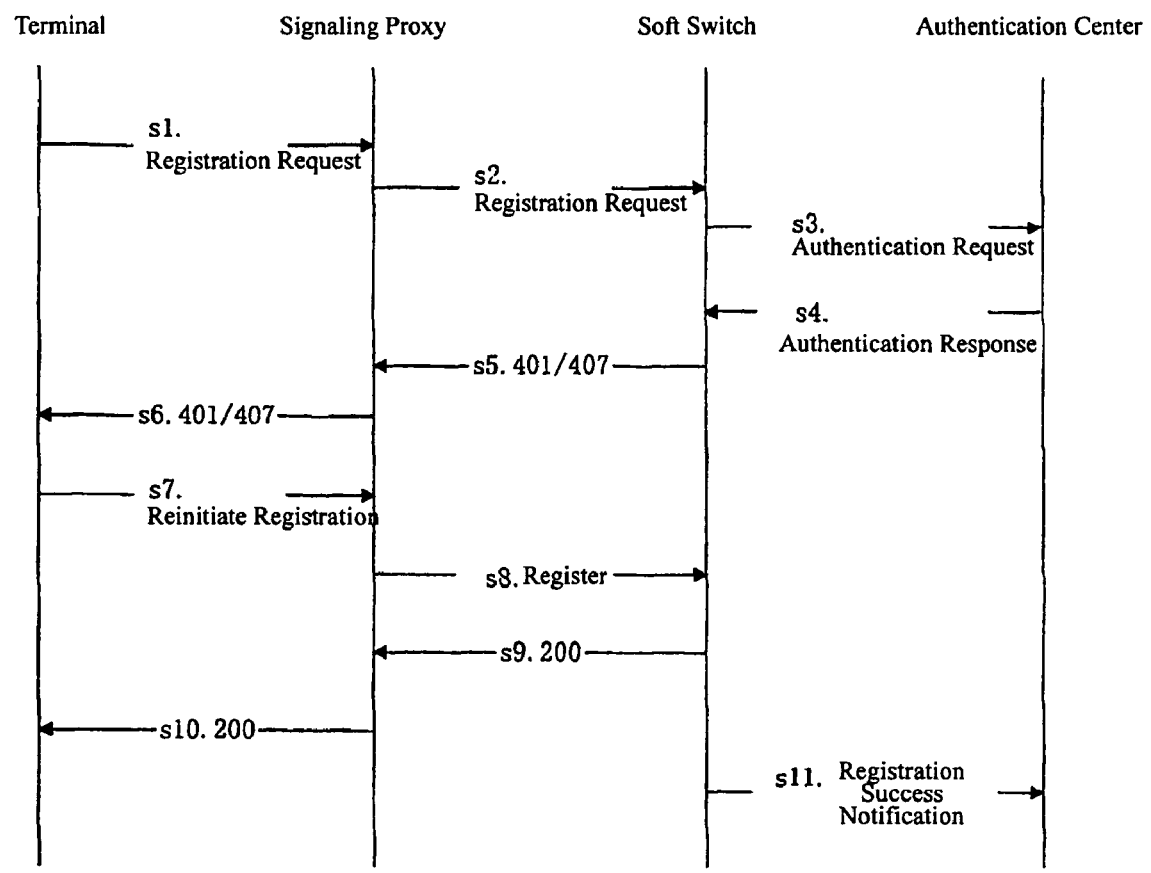
FIG. 5 is a schematic diagram of a communication process of a key distribution according to an embodiment of the present invention implemented in an SIP protocol registration authentication process.

FIG. 5 is a specific communication process of a registration authentication in the SIP protocol. Again in a network environment with a signaling proxy, this communication process embodies the registration and the response messages in the above general flow as specific SIP protocol messages, and the parameters contained in the messages of each step in the process are corresponding to those as defined in the above general flow.

The specific protocol messages in the communication process are described as below. In steps s1 and s2, the registration request message is a Register message in the SIP protocol. In steps s5 and s6, the registration failure response message is a response message code in the SIP protocol, wherein 401 indicates a response message code in the SIP protocol indicative of that an authentication is required for a terminal, and 407 indicates a response message code in the SIP protocol indicative of that an authentication is required for a proxy. In steps s7 and s8, the re-registration message is a registration message in the SIP protocol. In steps s9 and s10, the registration success response message is a response message code indicative of that the request succeeds, i.e. OK. In steps s3, s4 and s11, the messages are independent of the specific call protocol, and can be a general authentication protocol or adopt a different protocol, e.g., Radius, Diameter or the like, depending on an application situation.

Figure 6:
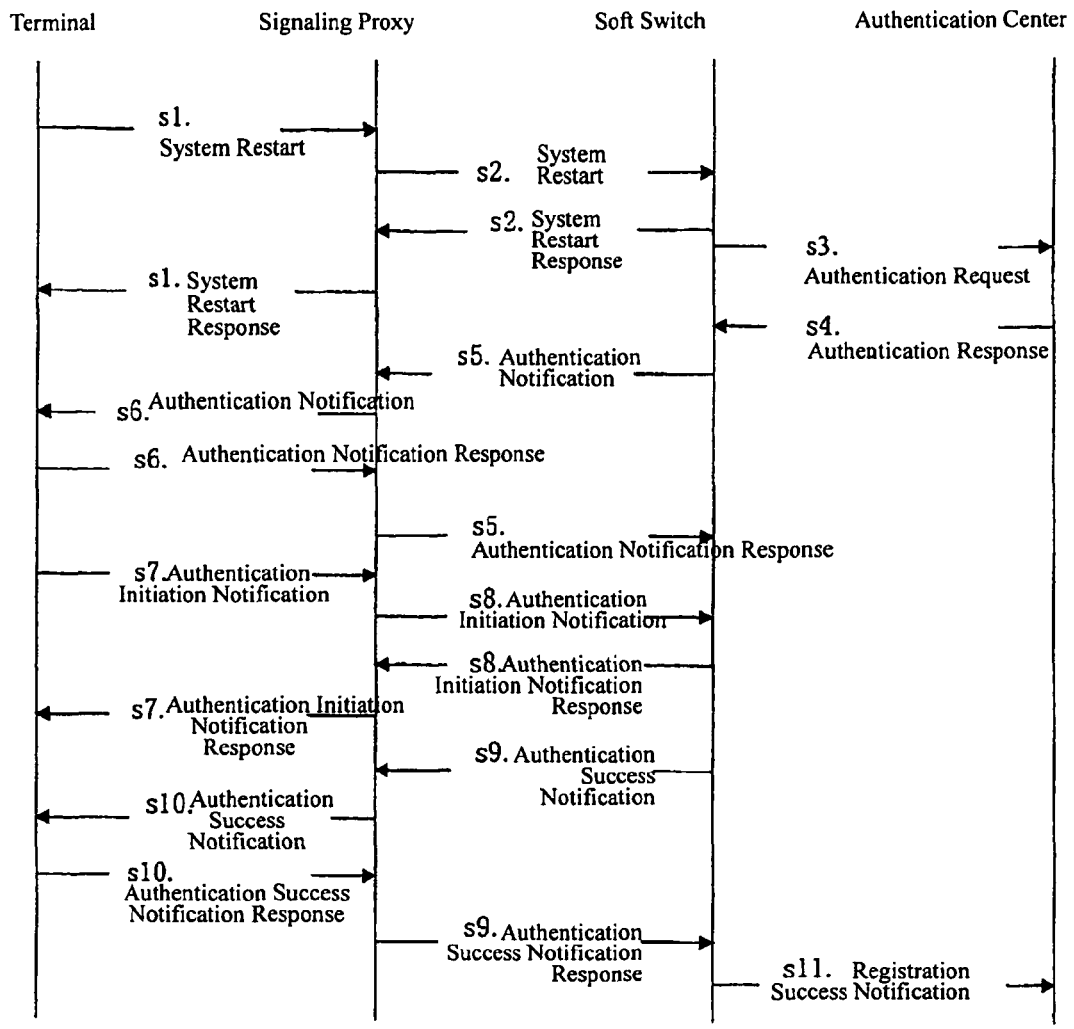
FIG. 6 is a schematic diagram of a communication process of a key distribution according to an embodiment of the present invention implemented in an MGCP protocol registration authentication process.

FIG. 6 is a specific communication process of a registration authentication in the Media Gateway Control Protocol (MGCP) protocol. Again in a network environment with a signaling proxy, this communication process embodies the registration and the response messages in the above general flow as specific MGCP protocol messages, and the parameters contained in the messages of each step in the process are corresponding to those as defined in the above general flow.

The specific protocol messages in the communication process are described below. In steps s1 and s2, the registration request message is a System Restart message command RSIP and its response message in the MGCP protocol. In steps s5 and s6, the registration failure response message is a Request Notification message command RQNT in the MGCP protocol, indicative of that the system requires authentication for the terminal. In steps s7 and s8, the re-registration message is a NOTIFY message command in the MGCP protocol, indicative of that a terminal initiates an authentication. In steps s9 and s10, the registration success response message is a Request Notification message command RQNT in the MGCP protocol, notifying a terminal of a successful authentication. In steps s3, s4 and s11, the messages are independent of the specific call protocol, and can be a general authentication protocol or adopt a different protocol, e.g., Radius, Diameter or the like, depending on an application situation.

FIG. 7 is a specific communication process of a registration authentication in the H.248 protocol. Again in a network environment with a signaling proxy, this communication process embodies the registration and the response messages in the above general flow as specific H.248 protocol messages, and the parameters contained in the messages of each step in the process are corresponding to those as defined in the above general flow.

The specific protocol messages in the communication process are described below. In steps s1 and s2, the registration request message includes a system service status change message command SERVICE CHANGE and its response message Rsp in the H.248 protocol, indicative of that a system starts to enter a service status and imitates a registration. In steps s5 and s6, the registration failure response message is an attribute modification message command MODIFY in the H.248 protocol, indicative of that a system requests to authenticate a terminal. In steps s7 and s8, the re-registration message is a notification message command NOTIFY in the H.248 protocol, indicative of that a terminal initiates an authentication. In steps s9 and s10, the registration success response message is an attribute modification message command MODIFY message in the H.248 protocol, notifying a terminal of a successful authentication. In steps s3, s4 and s11, the messages are independent of the specific call protocol, and can be a general authentication protocol or adopt a different protocol, e.g., Radius, Diameter or the like, depending on an application situation.

FIG. 8 is a specific communication process of a registration authentication in the H.323 protocol. Again in a network environment with a signaling proxy, this communication process embodies the registration and the response messages in the above general flow as specific H.323 protocol messages, and the parameters contained in the messages of each step in the process are corresponding to those as defined in the above general flow.

The specific protocol messages in the communication process are described below. In steps s1 and s2, the registration request message is a GK request message in the H.323 protocol, indicative of that "Who is my GK". In steps s5 and s6, the registration failure response message is a GK rejection message in the H.323 protocol, indicative of that a GK performs no registration for a terminal and an authentication is required. In steps s7 and s8, the re-registration message is an authentication request message in the H.323 protocol containing authentication information and indicative of that a terminal initiates an authentication. In steps s9 and s10, the registration success response message is a registration success message in the H.323 protocol, notifying a terminal of a successful authentication. In steps s3, s4 and s11, the messages are independent of the specific call protocol, and can be a general authentication protocol or adopt a different protocol, e.g., Radius, Diameter or the like, depending on an application situation.

Although the present invention has been described in connection with the preferred embodiments thereof, it shall be appreciated that the present invention is not limited to the embodiments and that various equivalent changes can be made thereto with reference to the description and the drawings without a departure from the scope of the present invention as defined by the accompanying claims.

What is claimed is:

1. A key distribution method applied in the Next Generation Network comprising a terminal, a soft switch and an authentication center, comprising:

the terminal sending a registration request message to the soft switch for a registration;

the soft switch sending an authentication request message to the authentication center for the authentication for the terminal; and the authentication center authenticating the terminal, generating a session key for the terminal and the soft switch, and sending the session key to the soft switch, so as to be distributed to the terminal upon a successful authentication;

wherein the step of the authentication center authenticating the terminal comprises:

the authentication center generating a first verification word for the terminal according to a key Kc shared with the terminal, encrypting the session key with the shared key Kc, and returning the encrypted session key and the first verification word to the soft switch;

the soft switch returning a registration failure response message to the terminal to notify the terminal of a registration failure;

the terminal generating a second verification word according to the key Kc shared with the authentication center, and sending a registration message containing the second verification word to the soft switch for a registration again; and the soft switch authenticating the terminal according to the first verification word and the second verification word;

wherein the step of the soft switch distributing the session key to the terminal comprises:

the soft switch returning to the terminal a registration success response message containing the session key encrypted with the shared key Kc, and sending a terminal authentication success message to the authentication center; and the terminal decrypting the session key encrypted by the authentication center according to the shared key Kc.

2. The key distribution method according to claim 1, wherein the method further comprises:

the terminal sending to the soft switch a list of security mechanisms supported by the terminal and priority information of each security mechanism;

the soft switch choosing an appropriate security mechanism for communication according to the list of security mechanisms and the priority information of each security mechanism of the terminal.

3. The key distribution method according to claim 1, wherein the registration request message and the registration message are SIP protocol registration messages, and the registration failure response message is a SIP protocol response message; or wherein the registration request message is a system restart message and a corresponding response message in the MGCP protocol, the registration failure response message is a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message is an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, and the registration message is a registration request message in the H.323 protocol.

4. The key distribution method according to claim 1, wherein the registration request message and the registration message are SIP protocol registration messages, the registration failure response message is a SIP protocol response message, and the registration success response message is a SIP protocol registration request success message; or wherein the registration request message is a system restart message and a corresponding response message in the MGCP protocol, the registration failure response message and the registration success response message are a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message and the registration success response message are an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, the registration message is a registration request message in the H.323 protocol, and the registration success response message is a registration success message in the H.323 protocol.

5. The key distribution method according to claim 2, wherein the registration request message and the registration message are SIP protocol registration messages, the registration failure response message is a SIP protocol response message, and the registration success response message is a SIP protocol registration request success message; or wherein the registration request message is a system restart message and a corresponding response message in the MGCP protocol, the registration failure response message and the registration success response message are a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message and the registration success response message are an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, the registration message is a registration request message in the H.323 protocol, and the registration success response message is a registration success message in the H.323 protocol.

6. A key distribution method applied in the Next Generation Network comprising a terminal, a signaling proxy, a soft switch and an authentication center, comprising:

the terminal sending a registration request message through the signaling proxy to the soft switch for a registration;

the soft switch sending an authentication request message to the authentication center for the authentication for the terminal; and the authentication center authenticating the terminal, generating a session key for the terminal and the signaling proxy, and sending the session key to the soft switch, so as to be distributed through the signaling proxy to the terminal upon a successful authentication;

wherein the step of the authentication center authenticating the terminal comprises:

the authentication center generating a first verification word for the terminal according to a key Kc shared with the terminal and a key Ksp shared with the signaling proxy, encrypting the session key respectively with the shared key Kc and the shared key Ksp, and returning the encrypted session key and the first verification word to the soft switch;

the soft switch returning a registration failure response message through the signaling proxy to the terminal to notify the terminal of a registration failure;

the terminal generating a second verification word according to the key Kc shared with the authentication center, and sending a registration message containing the second verification word to the signaling proxy to be forwarded to the soft switch for a registration again; and the soft switch authenticating the terminal according to the first verification word and the second verification word;

wherein the step of the soft switch distributing the session key to the terminal comprises:

the soft switch forwarding to the signaling proxy a terminal registration success response message containing the session key encrypted by the authentication center respectively with the shared keys Kc and Ksp, and the signaling proxy decrypting with the shared key Ksp the session key encrypted by the authentication center with the shared key Ksp, calculating a message verification word for the registration success response message with the decrypted session key, and forwarding to the terminal the registration success response message containing the message verification word and the session key encrypted with the shared key Kc; and the terminal decrypting the session key encrypted by the authentication center according to the shared key Kc, and authenticating with the decrypted session key the message authentication word of the message returned from the signaling proxy so as to authenticate an identity of the signaling proxy, an integrity of the message and whether security mechanism parameters of the terminal returned from the signaling proxy are correct.

7. The key distribution method according to claim 6, wherein the method further comprises:

the terminal sending to the signaling proxy a list of security mechanisms supported by the terminal and priority information of each security mechanism, and the signaling proxy choosing an appropriate security mechanism for communication according to the security mechanisms supported by the terminal and the priority information of each security mechanism.

8. The key distribution method according to claim 6, wherein the registration request message and the registration message are SIP protocol registration messages, and the registration failure response message is a SIP protocol response message; or wherein the registration request message comprises a system restart message and a corresponding response message in the MGCP protocol, the registration failure response message is a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message is an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, and the registration message is a registration request message in the H.323 protocol.

9. The key distribution method according to claim 6, wherein the registration request message and the registration message are SIP protocol registration messages, the registration failure response message is a SIP protocol response message, and the registration success response message is a SIP protocol registration request success message; or wherein the registration request message comprises a system restart message and a corresponding response message in the MGCP protocol, the registration failure response message and the registration success response message are a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message and the registration success response message are an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, the registration message is a registration request message in the H.323 protocol, and the registration success response message is a registration success message in the H.323 protocol.

10. The key distribution method according to claim 7, wherein the registration request message and the registration message are SIP protocol registration messages, the registration failure response message is a SIP protocol response message, and the registration success response message is a SIP protocol registration request success message; or wherein the registration request message comprises a system restart message and a corresponding response message in the MGCP protocol, the registration failure response message and the registration success response message are a notification request message and a corresponding response message in the MGCP protocol, and the registration message comprises a notification message and a corresponding response message in the MGCP protocol; or wherein the registration request message comprises a system service status change message and a corresponding response message in the H.248 protocol, the registration failure response message and the registration success response message are an attribute modification message and a corresponding response message in the H.248 protocol, and the registration message comprises a notification message and a corresponding response message in the H.248 protocol; or wherein the registration request message is a gatekeeper request message in the H.323 protocol, the registration failure response message is a gatekeeper rejection message in the H.323 protocol, the registration message is a registration request message in the H.323 protocol, and the registration success response message is a registration success message in the H.323 protocol.

* * * * *